United States Patent
Peter et al.

[15] 3,679,247
[45] July 25, 1972

[54] HUB-TO-SHAFT CLAMP CONNECTION ASSEMBLY

[72] Inventors: Oskar E. Peter, Schlosstrasse, 9/1, 7129 Brackenheim; Lothar Peter, Wagnerstrasse 8, 7129 Guglingen, both of Germany

[73] Assignee: said Oskar E. Peter, by said Lothar Peter

[22] Filed: Oct. 26, 1971

[21] Appl. No.: 191,994

[30] Foreign Application Priority Data

July 26, 1971 Germany..................P 21 37 313.7

[52] U.S. Cl.....................................287/52.06
[51] Int. Cl........................................F16d 1/06
[58] Field of Search..................287/52.06, 52.04, 52.09

[56] References Cited

UNITED STATES PATENTS 525,775   9/1894   Wainwright..................287/52.06

OTHER PUBLICATIONS

German printed application 1,099,806 2/1961 Oskar E. Peter 1 sht. dwg. 2 pp. spec.
German printed application 1,179,057 10/1964 Oskar E. Peter et al. 1 sht. dwg. 3 pp. spec.

Primary Examiner—Andrew V. Kundrat

[57] ABSTRACT

To connect a hub to a shaft, spaced inner and outer rings have conical surfaces formed thereon, the conical surfaces diverging towards the outer sides of the connection. A pair of intermediate clamp rings which have essentially matching (but possibly slightly smaller conical angles) conical surfaces are inserted between the inner and outer rings, one from each side. Screws pass through one of the clamp rings and bear against its outer face, and are threaded into the other clamp ring, to tighten the rings against each other, the inner and outer rings being formed with a central recess of dove-tailed cross-section, in which a ring-shaped metal disc is inserted having an outer surface substantially matching the dove-tailed conical surfaces of the inner and outer rings. The clamp ring against which the screw surfaces bear is additionally formed with threaded openings to permit screws to be threaded therein, to then bear against the metal ring when separation of the hub to shaft connection is desired.

11 Claims, 5 Drawing Figures

PATENTED JUL 25 1972 3,679,247
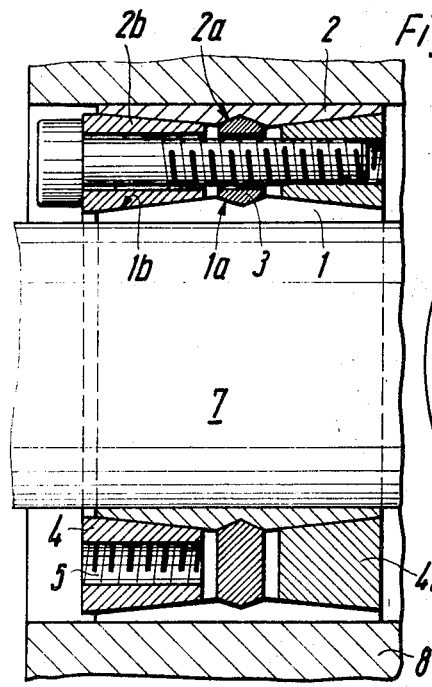
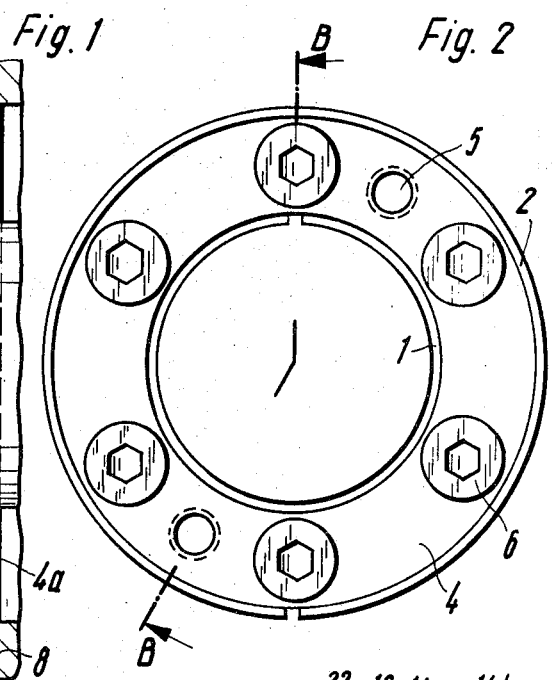
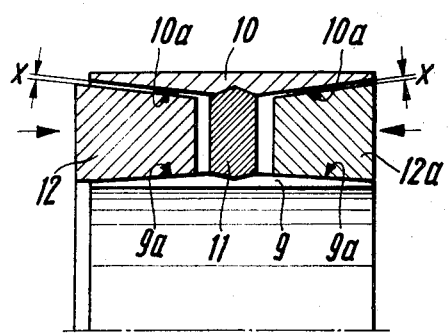
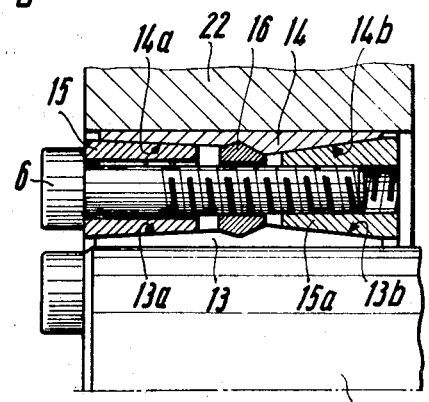
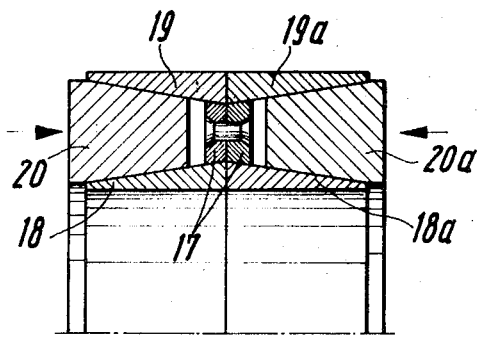

HUB-TO-SHAFT CLAMP CONNECTION ASSEMBLY

The present invention relates to a hub-to-shaft clamping connection assembly, and more particularly to such an assembly in which ring-shaped elements are inserted between the hub and the shaft, formed with outwardly expanding, oppositely arranged conical surfaces, to be together by clamping rings of substantially similar conical surfaces, which are tightened together by circumferentially arranged tightening screws.

Various interconnections from a hub to a shaft are known — see for example German Pat. No. 1,099,806. Such interconnections in which a pair of clamping rings, acting against each other on conical surfaces are used, have the advantages with respect to other clamping arrangements that, when the clamping arrangement is securely clamped for example by tightening nuts or screws, axial shifting of the clamping rings on the shaft, or in the hub, respectively, is avoided. Thus, the hub is exactly placed with respect to the shaft after tightening, as well as before. Avoiding shifting of the hub with respect to the shaft decreases frictional forces during tightening, so that substantial torque can be transmitted. The angle of the generatrix of the cone usually is selected to be in the order of 14°.2 minutes, which corresponds to a tangent of tan 0.25. The angle of the cone is thus above that of self-binding, and the hub-to-shaft connection can be released. To provide for substantial transmission of torque between the hub and the shaft, a plurality of clamping screws are circumferentially located, like planets in a planetary drive. The screws are made of high quality material, having a strength of 100 kp/mm$^2$. A substantial axial clamping force can be obtained and the operative interconnection between shaft and hub, by means of the conical surfaces, provides good radial pressure. A large number of circumferentially arranged screws are necessary, preferably so located that the heads of the screws are close to each other. Such close location, requiring bores through one clamping ring and threaded bores in the other have disadvantages. Among the disadvantages are the expense of manufacture, and the time taken to mount such an assembly, particularly when the size of the hub-to-shaft connection increases. Approximately 44 clamping screws must be tightened in order to secure a hub to a shaft having an average diameter of about 50 cm, the screws being standard metric M 24 type. As the shaft diameter increases, the number of screws increases substantially. The screws additionally have to be tightened by means of a torque wrench, in a crossed tightening pattern, in order to be able to transmit the design torque from shaft to hub. The transmitted torque thus depends to some extent on the accuracy and care with which the hub-to-shaft connection is mounted or tightened by the mechanic carrying out the work. Reliability of operation depends essentially on the tightness and forces with which the clamping screws are loaded.

It is an object of the present invention to provide a hub-to-shaft connection in which the connection can be separated without difficulty and in which the number of tightening screws to be used is decreased, while still being able to transmit, for equal dimensions, the same, or preferably higher torque; and which are accurate with respect to centricity of hub and shaft.

SUBJECT MATTER OF THE PRESENT INVENTION

Briefly, inner and outer rings are provided, the inner surrounding the shaft and the outer lying against the inside of the hub. The rings are formed with opposing conical surfaces, diverging towards the outer sides. Interiorly of the rings is a ring-shaped dove-tailed groove, providing an additional pair of conical surfaces, in which a ring-shaped metal disc is located having outer surfaces matching the conical surfaces of the dove-tailed groove. The divergent conical surfaces of the inner and outer rings may have a conical angle, with respect to the central axis of the shaft, in the order of 6°, or less. Double-conical clamp rings are inserted in the space formed by the divergent conical inner and outer rings, the double-conical rings being tightened against each other by clamping screws passing through one ring, through the metal disc and being threaded into the other. The ring through which the screws pass is additionally formed with at least one, and preferably a few more threaded holes, so that, for removal, bolts can be inserted into the threaded holes and tightened against the metal disc, to push out the clamping ring between the conical surfaces.

The screws preferably are Allen head screws made of a material having a minimum strength of 130 kp/mm$^2$, thus being able to be stressed more and to transmit a higher torque.

The invention will be described by way of example with reference to the accompanying drawings, wherein:

FIG. 1 is a longitudinal sectional view of a hub-to-shaft connection, utilizing split inner and outer rings, the section being taken along line B—B of FIG. 2;

FIG. 2 is a front view of the hub-to-shaft connection of FIG. 1;

FIG. 3 is a fragmentary cross-sectional view, corresponding to the upper half of FIG. 1, and illustrating a different embodiment;

FIG. 4 is a fragmentary cross-sectional view through the center line of a shaft, illustrating a different embodiment; and FIG. 5 is a fragmentary cross-sectional view through the center line of the shaft illustrating another embodiment, in which an axially split metal ring is used.

Referring now to the drawings and particularly to FIGS. 1 and 2: A slit inner ring 1 has outer conical surfaces 1b, and is seated on a shaft 7. A hub 8 has an outer ring 2 located therein, likewise axially split (see FIG. 2) and having inwardly facing conical surfaces 2b. The conical surfaces 1b, 2b face each other. The rings 1, 2 are formed at their center with a dove-tailed groove 1a, 2a respectively, in which a ring 3 is located being formed with corresponding conical surfaces fitting into the conical grooves 1a, 2a formed in the center of rings 1, 2. The rings 1, 2, after having been assembled, form together with the ring 3 one complete non-removable unit, rings 1 and 2 being radially movable. The assembly formed of rings 1, 2, and central ring 3 is connected together by clamping rings 4, 4a, which are inserted from both sides between rings 1, 2. Clamping rings 4, 4a are interconnected by clamping screws 6, having Allen heads. Screws 6 pass through bores formed in ring 4, through corresponding bores in ring 3, and are threaded into ring 4a. The screws hold the entire assembly together on the shaft and, when tightened, move the conical surfaces of rings 4, 4a towards each other to press the rings 1, 2 away from each other and against the respective shaft, and hub elements.

Ring 4, through which the screws 6 pass is formed in addition to the bores through which the screws pass, with a pair additional bores 5 (FIGS. 1, 2) which are threaded, the threading being preferably similar to the threads formed in ring 4a and receiving the bolts 6. The threaded holes 5, during operation, may be closed off by end or cap screws, for example of plastic, and not shown.

When assembling the connection of FIGS. 1 and 2, tightening of bolts 6 causes the concentrically located rings 1, 2 to be engaged by the rings 4, 4a, which move against each other when bolts 6 are rotated, due to the threads formed in the bores of rings 4a. The slit inner and outer rings 1, 2, which are separated by the metal ring 3, held in the dove-tailed grooves 1a, 2a are elastically divided in two clamping parts, and are effectively radially evenly loaded with respect to shaft 7 and against the bore of the hub 8, so that the torque transmitting connection of the assembly between shaft 7 and shaft 8 becomes effective, to transmit a substantial amount of torque. If the interconnection is to be released, in spite of the small angle of the conical surfaces, which are self-binding, then bolts 6 are retracted for some distances and clamp ring 4a is freed from binding by light impacts, or hammer taps on the ends of bolts 6. Thereupon the closing screws, previously inserted in holes 5 (if provided) are removed. Screws 6 are screwed into the holes 5 until they bear against the metal ring 3. Continued rotation of screws 6 will now cause backing off of the clamp ring 4, thus releasing the clamping engagement of the ring 4 with the conical surfaces 1b, 2b of the inner and outer rings, the entire connection now being easily releasable.

Embodiment of FIG. 3: An axially slit inner ring 9, adapted to be seated on a shaft, is faced, in spaced relation, by a similarly slit outer ring 10, adapted to seat on the inside of the bore of a hub. Inner ring 9 has divergent conical surfaces 9a, the outer ring 10 is formed with divergent conical surfaces 10a. The conical surfaces 9a of the inner ring 9 have a smaller conical angle than the angle of the conical surfaces 10a of the outer ring. When the rings are loosely assembled with clamp rings 12, 12a, and before being tightened, play indicated at x between the inner conical surfaces 10a of the outer ring 10, and the outer surfaces of the clamping rings 12, 12a will be present. The rings 9, 10 are again formed longitudinally with a dove-tailed groove in which a similarly profiled metal ring 11 is placed.

Upon axial stressing of the double-conical clamping rings 12, 12a by exerting pressure in the direction of the arrows, for example by the screws as described in detail in connection with FIGS. 1 and 2 and not described again, the conical inner ring 9 is first stressed. The double-conical clamping rings 12, 12a then will be moved inwardly until the distance of the tolerance, or play x is bridged so that the double conical clamping rings 12, 12a will engage the inner conical surfaces 10a of the outer ring 10, to then provide pressure in radial direction against the outer ring 10. The radial pressures can thus so vary that any shifting of the inner ring 9 on the shaft is effectively prevented, since the inner ring 9 is clamped before any clamping pressure is exerted against the outer ring 10.

Embodiment of FIG. 4: An axially slit inner ring 13 is faced with an axially slit outer ring 14, rings 13, 14 having conical surfaces. The facing conical surfaces 13a, 14a, of the inner and outer rings 13, 14, respectively, have different conical angles with respect to the facing conical surfaces 13b, 14b at the other side of the central metal ring 16. The clamping rings 15, 15a have matching conical surfaces, that is, the conical surfaces of ring 15 matches those of surfaces 13a, 14a, whereas the surfaces of ring 15a matches the conical surfaces 13b, 14b. Of course, the surfaces of rings 13a, 14a can be arranged to be slightly spaced, or slightly different, so that the play referred to in connection with FIG. 3 is also obtainable in this embodiment. Axially extending clamping screws 6 pass through the clamping ring 15 and metal ring 16, and are screwed into clamping ring 15a. The metal ring 16 secures inner and outer rings 13, 14 together into one assembly. The side having the conical surfaces with a flatter, or shallower conical angle is preferably the side at the edge of the shaft 21 and hub 22, and also the side from which the clamping screws 6 are introduced.

Embodiment of FIG. 5: The inner and outer rings in the embodiment of FIG. 5 are not axially slit (as seen in FIG. 2) but rather are radially slit into two radially adjacent sections 18, 18a and 19, 19a respectively. The ring portions 18, 19 are formed with divergent conical surfaces, the ring portions 18a, 19a being formed with oppositely diverging conical surfaces. Metal disc 17 likewise is formed of two parts, which are interconnected by rivets, screws, spot welding or the like after the ring sections 18, 18a and 19, 19a have been assembled thereover, so that the composite assembly formed of inner rings 18, 18a, circumferential ring 17, and outer rings 19, 19a forms an assembly of which the parts are not readily separable. The surfaces of the ring sections forming the ring 17 match the conical surfaces of both the inner and outer rings, when assembled. Clamp rings 20, 20a, inserted from opposite sides in the assembly can then be stressed in direction of the arrows, for example by screws or bolts 6 (not shown in FIG. 5). The conical surfaces on the ring portions 18, 18a and 19, 19a, respectively, may be as shown in FIG. 5 or have the relative relationships as indicated in FIGS. 3 or 4. Radially slitting the inner and outer rings to form two ring sections 18, 18a and 19, 19a respectively permits use of completely circumferentially extending rings, assembled and held together by the later joined portions of the circumferential ring 17; when the inner and outer rings are longitudinally slit, the circumferential ring may be a single unit or single piece similar to ring 3, although the conical surfaces and relationships illustrated in FIG. 5 can be maintained; thus, the groove holding the elements together need not be formed in the inner and outer rings, but rather the dove-tailed groove can be in the circumferential ring 17, securing the inner and outer rings 18, 19 into one assembly, from which parts cannot be readily separated, so that they might be lost.

The small conical angle of the clamping assembly of the present invention, for example having a tangent of tan 0.1 permits transfer of a substantial amount of torque, much larger than that of other clamping arrangements which have a greater conical angle, for example of tan 0.25. Additionally, centricity is improved and the clamping effect increased even with comparatively small radial extent of the hub-to-shaft connection. Use of high strength clamping bolts 6, for example of a material having a strength of 130 kp/mm² further increases the torque transmission.

Various experiments and comparative measurements have been made comparing the clamping effect of the hub-to-shaft connection of the present invention with known hub-to-shaft connections. On a shaft of about 50 mm diameter, to which a hub was connected of about 80 mm diameter, 12 screws were used with metric standard thread M 8, the screws having a material strength of 100 kp/mm². A similar hub and shaft were interconnected with a hub-to-shaft connection of the present invention utilizing only six screws of metric thread M 8, having a material strength of 130 kp/mm². The screws were tightened in accordance with maximum tightening torque, in accordance with manufacturing specification. The resulting axial clamping forces were surprising. The prior art hub-to-shaft clamp, utilizing the 12 clamping screws could transmit a maximum torque of $M_t = 177$ kpm. The hub-to-shaft connection with the same diameters, and using only six clamping screws of M 8 size, but having a material strength of 130 kp/mm² could transmit the substantially higher torque of 250 kpm, thus effecting an increase in torque transmission of about 140 per cent. This substantial increase appears to be due to the fact that the smaller conical angle of the clamping rings provides a greater transfer relationship, combined with the increased strength of the holding screws or bolts. Still, the clamping connection could be separated without difficulty since, even though the conical surfaces were self-binding, no additional tools to release the clamp connection are necessary, to the presence of threaded bores 5 (FIGS. 1, 2) permitting bolts to be threaded therein and to release the outer clamping ring by pressure against the interior metal ring. Centricity of the connection was further improved, and eccentricity reduced from 0.08 mm of known clamping rings to 0.02 mm, with a connection tightened under shop conditions and loosely tightened. The dove-tailed interconnection between the inner ring, the outer ring, and the interior metal ring, combined with the smaller conical angle of the clamping rings provides for uniform radial pressure of the clamping rings between the shaft and the bore of the hub, and thus effects essentially uniform circumferential loading of all components. The interconnection of the inner and outer rings by the intermediate ring, to form one unitary assembly from which parts cannot become lost or separated, is of advantage under shop conditions.

In the embodiment of FIG. 3, the play x may be so arranged that the space x is parallel to the conical surfaces formed by the clamping rings 12, 12a and by the outer ring 10. Thus, the space, in projection, indicated by the dimension x in FIG. 3 may be a parallel slit; alternatively, the angles of the conical surfaces 9a and 10a may be different, and, additionally, the angles of the conical surfaces 9a, or 10a, and the engaging surfaces on the clamping rings 12, 12a may be different. For example, the conical angle (with respect to an axial center line)

9a of the inner ring may be 3°; the conical angle of the inner conical surfaces 10a of the outer ring 10 (with respect to a central axis of the hub, or shaft) may be 6°. The cooperation of the different angles of the cones of the inner and outer rings, in combination with the play between the inner conical surface of the outer ring, and the corresponding outer conical surface provides for transmission of maximum torque, with reliable axial seating of the connection on a shaft.

The unit "kp" used in this specification means "kilopond", 1 kp being equivalent to 1 kilogram force.

We claim:

1. Hub-to-shaft clamping connection assembly comprising
    an inner ring (1) adapted to seat on the shaft and having a pair of outwardly tapering conical surfaces (1b) and forming, with the center of the shaft, an angle up to about 6°;
    an outer ring (2) adapted to seat within the hub and having a pair of outwardly tapering conical surfaces (2b) spaced from the conical surfaces of the inner ring and forming with the center of the hub an angle of up to about 6°;
    a pair of intermediate clamp rings (4, 4a) each having conical surfaces concentric with the facing surfaces of the outer and inner ring, one each being insertable from a side of the connection to clamp the inner and outer rings against the shaft and hub, respectively, and the conical surfaces of the clamp rings against the conical surfaces of the inner and outer rings, respectively;
    screw means (6) passing through one of the clamp rings and bearing against the outer face thereof, and threaded into the other clamp ring to tighten the clamp rings against each other, the inner and outer rings, each, being formed essentially at the center of the connection assembly with dove-tail surfaces, to provide additional conical surfaces;
    a metal ring (3) having an outer surface substantially matching the additional conical surfaces, the metal ring (3) being formed with openings matching the locking screw means to fasten the clamp rings together;
    and wherein the clamp ring through which the screw means pass are additionally formed with threaded openings (5) to permit threading of the screws therein to bear against said metal ring and thus permit release of said clamp ring after tightening.

2. Assembly according to claim 1, wherein the screw means have a material strength of about 130 kp/mm².

3. Assembly according to claim 1, wherein the screw means are recessed head screws.

4. Assembly according to claim 1, wherein the outer conical surface (9a) of the inner ring (9) has a lesser conical angle than the inner conical surface (10a) of the outer ring (10) to provide for play(x) between the respective surfaces of the clamp rings (12, 12a) before the assembly is tightened.

5. Assembly according to claim 1, wherein the outer conical surface (9a) of the inner ring (9) and the engaging conical surface of the clamp ring (12, 12a) have conical centers to provide for engagement first of the conical surface of the inner ring and then, upon axial movement of the clamp ring, of engagement of the conical surface on the clamp ring with the inwardly facing conical surface on the outer ring (10) to provide for first clamping pressure being exerted against the inner ring, and hence to seat the inner ring (9) on the shaft, before engagement of clamping pressure against the outer ring (10) seating against the hub.

6. Assembly according to claim 1, wherein (FIG. 4) the conical angle at opposite outer and inner conical surfaces (13a, 14a) on one side of the inner and outer rings (13, 14) respectively, are different from the conical angles of the outer and inner conical surfaces (13b, 14b) on the other side of the inner and outer rings, respectively; and the clamp rings have conical surfaces engaging the differently angled conical surfaces of the inner and outer rings.

7. Assembly according to claim 6, wherein the additional conical surfaces are recesses formed in the inner and outer rings, of dove-tail cross-section, said additional conical surface being non-symmetrical with respect to the axis of the connection assembly;
    and the metal ring (16) has substantially matching non-symmetrical surfaces.

8. Assembly according to claim 1, wherein the outer and inner rings and closed rings (18, 18a, 19, 19a) divided centrally into ring portions;
    and the metal ring (17) is formed of two parts with conical surfaces assembled together with said centrally separated rings, the end portions of the conical surfaces projecting over the central portions of the rings, the conical surfaces of the assembled metal ring holding the inner ring, the metal ring, and the outer ring together as a unitary assembly.

9. Assembly according to claim 8, wherein the two parts of the ring are identical as mirror images, the parts being secured together.

10. Assembly according to claim 1, wherein the inner and the outer ring are split rings.

11. Assembly according to claim 1, wherein the inner ring and the outer ring, each, are formed with a recess (1a, 2a), said recess being of dove-tailed cross-section and providing the additional conical surface, the metal ring being seated within said recess and having essentially matching conical surfaces.

* * * * *